(12) United States Patent
Collins

(10) Patent No.: US 8,540,127 B2
(45) Date of Patent: Sep. 24, 2013

(54) VEHICLE INSTRUMENT DISPLAY SUPPORT AND STORAGE APPARATUS

(75) Inventor: Kevin P. Collins, Mandeville, LA (US)

(73) Assignee: Textron Inc., New Orleans, LA (US)

(*) Notice: Subject to any disclaimer, the term of this patent is extended or adjusted under 35 U.S.C. 154(b) by 275 days.

(21) Appl. No.: 12/967,843

(22) Filed: Dec. 14, 2010

(65) Prior Publication Data
US 2012/0145861 A1 Jun. 14, 2012

(51) Int. Cl.
*B60R 11/02* (2006.01)
(52) U.S. Cl.
USPC ........ 224/553; 224/282; 248/324; 248/274.1; 248/221.11
(58) Field of Classification Search
USPC .............. 248/317, 323–324, 278.1, 911–912, 248/919, 274.1, 220.21, 221.11; 296/97.1, 296/97.4–97.5, 97.12–97.13, 37.7–37.7; 359/844, 875; 348/825, 836–843, 148; 361/679.01–679.02, 679.21, 679.09, 679.22, 361/679.26–679.27, 726, 679.55–679.58; 710/303–305; 224/553, 282, 483
See application file for complete search history.

(56) References Cited

U.S. PATENT DOCUMENTS

| | | | |
|---|---|---|---|
| 4,077,597 A * | 3/1978 | Greig | 248/477 |
| 5,322,315 A * | 6/1994 | Carsten | 280/479.2 |
| 5,822,023 A * | 10/1998 | Suman et al. | 348/837 |
| 6,179,263 B1 * | 1/2001 | Rosen et al. | 248/278.1 |
| 6,343,863 B1 * | 2/2002 | Wood | 353/13 |
| 6,439,638 B1 * | 8/2002 | Kawasaki et al. | 296/97.2 |
| 6,695,376 B1 * | 2/2004 | Hirano | 296/37.7 |
| 6,729,637 B2 * | 5/2004 | Wolters et al. | 280/491.3 |
| 6,843,468 B2 * | 1/2005 | Marshall et al. | 256/65.16 |
| 7,526,103 B2 | 4/2009 | Schofield et al. | |
| 7,663,706 B2 * | 2/2010 | Ryu | 348/836 |
| 7,690,611 B2 | 4/2010 | Asamarai et al. | |
| 7,793,967 B2 * | 9/2010 | McConnell | 280/491.1 |
| 2003/0042378 A1 * | 3/2003 | Imamura et al. | 248/274.1 |
| 2006/0145043 A1 * | 7/2006 | Liou et al. | 248/324 |
| 2008/0284922 A1 * | 11/2008 | Isobe et al. | 348/837 |
| 2011/0254309 A1 * | 10/2011 | Visagie | 296/97.6 |

* cited by examiner

*Primary Examiner* — Terrell McKinnon
*Assistant Examiner* — Ingrid M Weinhold
(74) *Attorney, Agent, or Firm* — Garvey, Smith, Nehrbass & North, L.L.C.; Charles C. Garvey, Jr.; Seth M. Nehrbass

(57) ABSTRACT

A vehicle instrument support and storage apparatus for a vehicle driven by a human driver who occupies a driver's seat of the vehicle provides a frame having a plate configured for attachment to a selected vehicle. The frame has a plurality of docking station positions. A rotary bearing is attachable to the vehicle. An instrument support includes a support panel and an arm having an inner and outer end portions, the arm inner end portion being connected to the rotary bearing. The instrument support panel is affixed to the outer end portion of the support arm. An interlock of the instrument support with one docking station places the instrument support panel in front of the driver of the vehicle. An interlock of the instrument support with the other docking station places the instrument support in a position that is spaced away from (laterally, circumferentially and/or radially) first position.

25 Claims, 12 Drawing Sheets

VEHICLE INSTRUMENT DISPLAY SUPPORT AND STORAGE APPARATUS

CROSS-REFERENCE TO RELATED APPLICATIONS

None

STATEMENT REGARDING FEDERALLY SPONSORED RESEARCH OR DEVELOPMENT

Not applicable

REFERENCE TO A MICROFICHE APPENDIX

Not applicable

BACKGROUND OF THE INVENTION

1. Field of the Invention

The present invention relates to a display support for use in a manned vehicle. More particularly, the present invention relates to an improved vehicle display support that provides a specially configured interlock of the instrument support with a first docking station to place the instrument support panel in front of the driver of the vehicle. An interlock of the instrument support with a second docking station places the instrument support in a position that is spaced away from (laterally, circumferentially and/or radially) first docking station. A locking portion includes a handle that enables the driver to grasp the handle to simultaneously: 1) move in a pivot motion the instrument support to either one of the docking station positions; and 2) selectively connect the instrument support to or disconnect the instrument support from a selected one of the docking stations.

2. General Background of the Invention

In general, vehicle instrument supports that enable the instrument to be moved relative to the vehicle are known. Examples of vehicle instrument supports are disclosed in the US Patents listed in the following table.

TABLE 1

| US Patent No. | Title | Date |
| --- | --- | --- |
| 7,526,103 | Imaging system for Vehicle | Apr. 28, 2009 |
| 7,690,611 | Display Mounting System and Method | Apr. 06, 2010 |

BRIEF SUMMARY OF THE INVENTION

The present invention provides a vehicle instrument support and storage apparatus for a vehicle driven by a human driver who occupies a driver's seat of the vehicle. The apparatus can be used for multiple display screen and keyboard quick-stow application. The apparatus provides a robust two (2) position nesting system.

The adjustable and independent display next can be retrofitted for various user and mission specific environments. The apparatus features quick release, quick engage locking pin or pins carried on a support panel carried on a pivot arm.

In a military environment (e.g., in a volatile situation or in a cramped vehicle condition), the apparatus offers a soldier a sound, rigid solution for quick stow or quick storage of an instrument having a display screen.

The apparatus includes a frame having a plate configured for attachment to a selected vehicle such as an automobile, truck, van, security vehicle, military vehicle, tank, personnel carrier or the like. The frame provides a plurality of docking station positions.

A rotary bearing is attachable to the vehicle, preferably at a position above the driver's head such as to a roof or roof portion, pillar or like structural part.

The instrument support includes a support panel and an arm having inner and outer end portions. The arm inner end portion is connected to the rotary bearing.

The instrument support panel is affixed to the outer end portion of the support arm.

The instrument support has a locking portion that interlocks the instrument support to a selected one of the docking stations.

An interlock of the instrument support with a first docking station places the instrument support panel in front of the driver of the vehicle.

An interlock of the instrument support with a second docking station places the instrument support in a position that is spaced away from (laterally, circumferentially and/or radially) first position.

The locking portion including a handle that enables the driver to grasp the handle to simultaneously:

1) move in a pivot motion the instrument support to either one of the docking station positions; and
2) selectively connect the instrument support to or disconnect the instrument support from a selected one of the docking stations.

In one embodiment, the support panel is pivotally attached to the support arm.

In one embodiment, the support panel has an opening and the docking station occupies said opening when the instrument support is interlocked with a selected one of the docking stations.

In one embodiment, the rotary bearing is positioned above the frame.

In one embodiment, the handle carries one or more locking pins and the docking station has one or more openings that are receptive of the pin or pins.

In one embodiment, the support panel interlocks with a selected docking station at a position generally in between the arm outer end portion and the rotary bearing.

In one embodiment, the support panel has inner and outer edge portions, and the handle is positioned next to the inner edge portion of the support panel.

In one embodiment, the docking stations each provide a plate, the plates being configured to extend into and occupy the opening.

In one embodiment, each plate has one or more inclined surfaces.

In one embodiment, each plate has plate openings and the handle interlocks with the plate by connecting with the plate at the plate openings.

BRIEF DESCRIPTION OF THE SEVERAL VIEWS OF THE DRAWINGS

For a further understanding of the nature, objects, and advantages of the present invention, reference should be had to the following detailed description, read in conjunction with the attached drawings which are identified as follows.

DETAILED DESCRIPTION OF THE INVENTION

Figure 1:
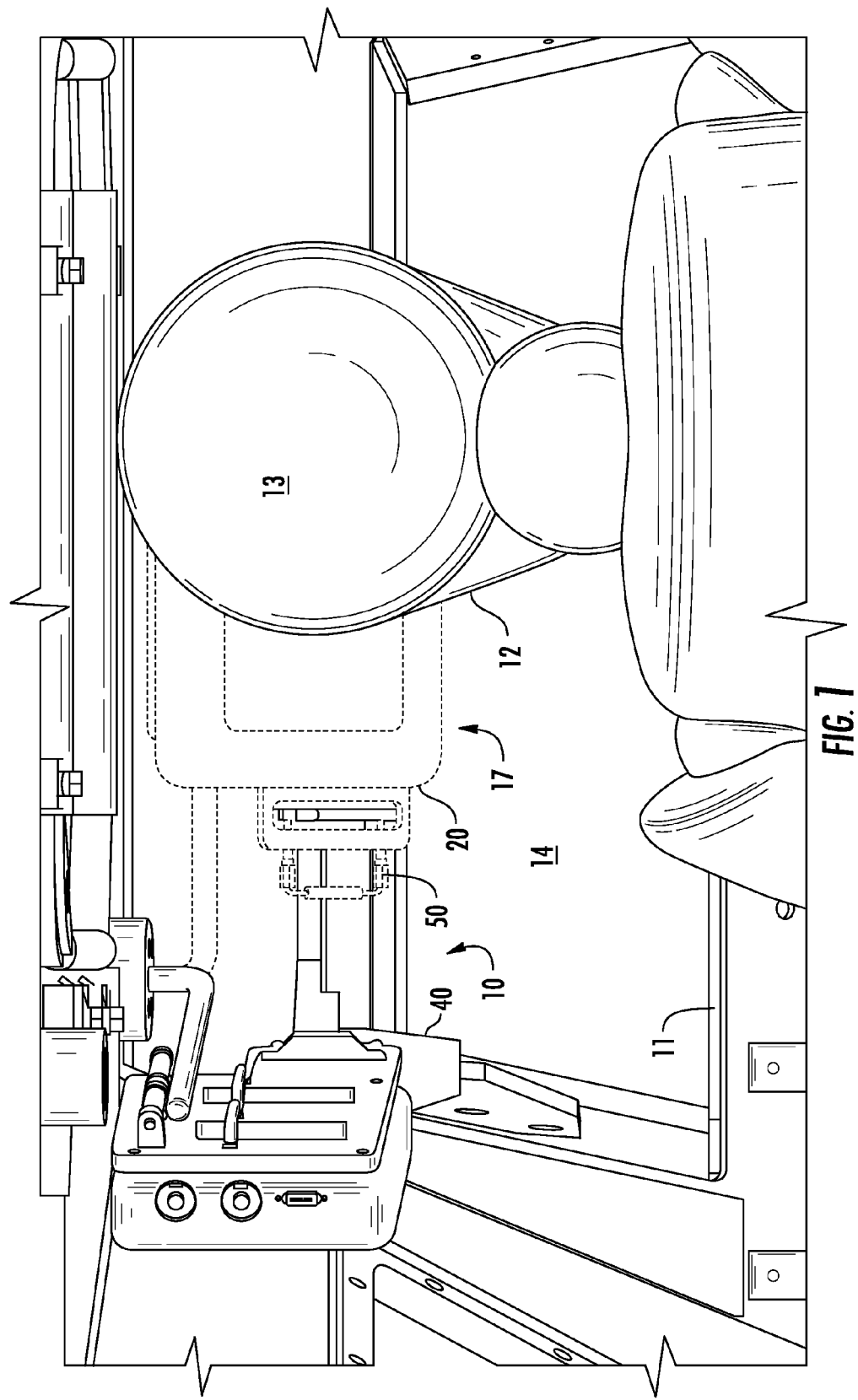
FIG. 1 is a perspective view of a preferred embodiment of the apparatus of the present invention.
Figure 2:
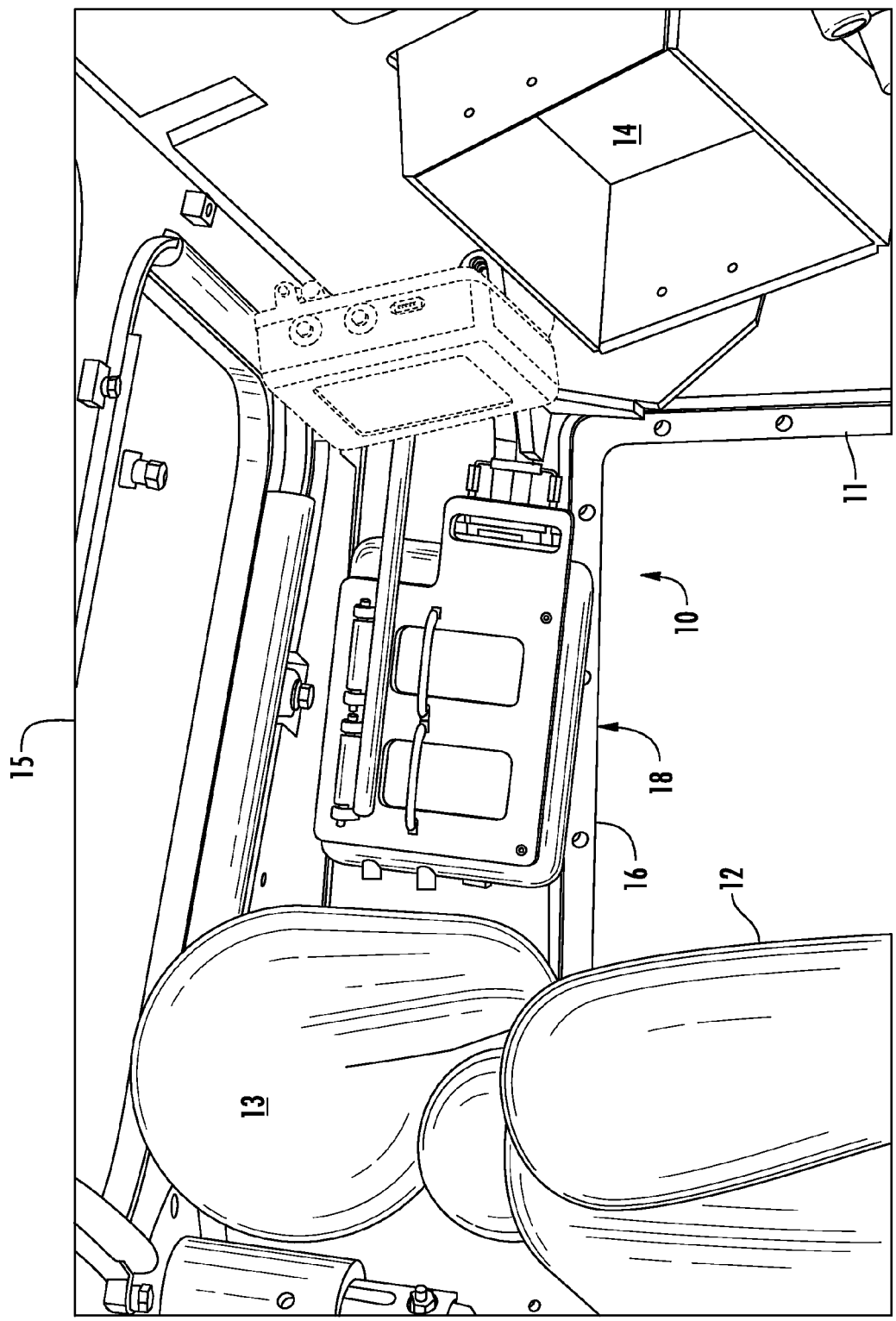
FIG. 2 is a perspective view of a preferred embodiment of the apparatus of the present invention.

FIGS. 1-12 show a preferred embodiment of the apparatus of the present invention, designated generally by the numeral 10. Vehicle instrument support 10 can be mounted to any selected vehicle 11, such as a truck, automobile, tank, personnel carrier or like vehicle. In the drawings, the support and storage apparatus 10 is attached to a vehicle 11 having a driver 12 occupying a driver's seat.

In FIG. 1, the driver's head 13 is shown positioned in a normal driving position wherein a display or instrument 20 can be positioned in a viewing position 17 that is in front of and on level with or elevated above the driver's head 13 as shown. The vehicle 11 has a front window or windshield 14. When instrument or display 20 is positioned in the viewing position 17, a driver 12 can view the instrument or display 20. The driver 12 can also view the road or any other terrain in front of vehicle 11 via the front window or windshield 14.

Such a vehicle 11 typically provides a roof or roof portion 15. As will be described more fully hereinafter, a spindle housing 22 is mounted in the vehicle 11 to a structural portion such as, for example, the roof or roof portion 15. A viewing position 17 can be seen in FIGS. 1, 2, 4-7 and 9. In the viewing position, the instrument or display 20 has been rotated upon a spindle or bearing 19 to a forward position as shown.

Figure 8:
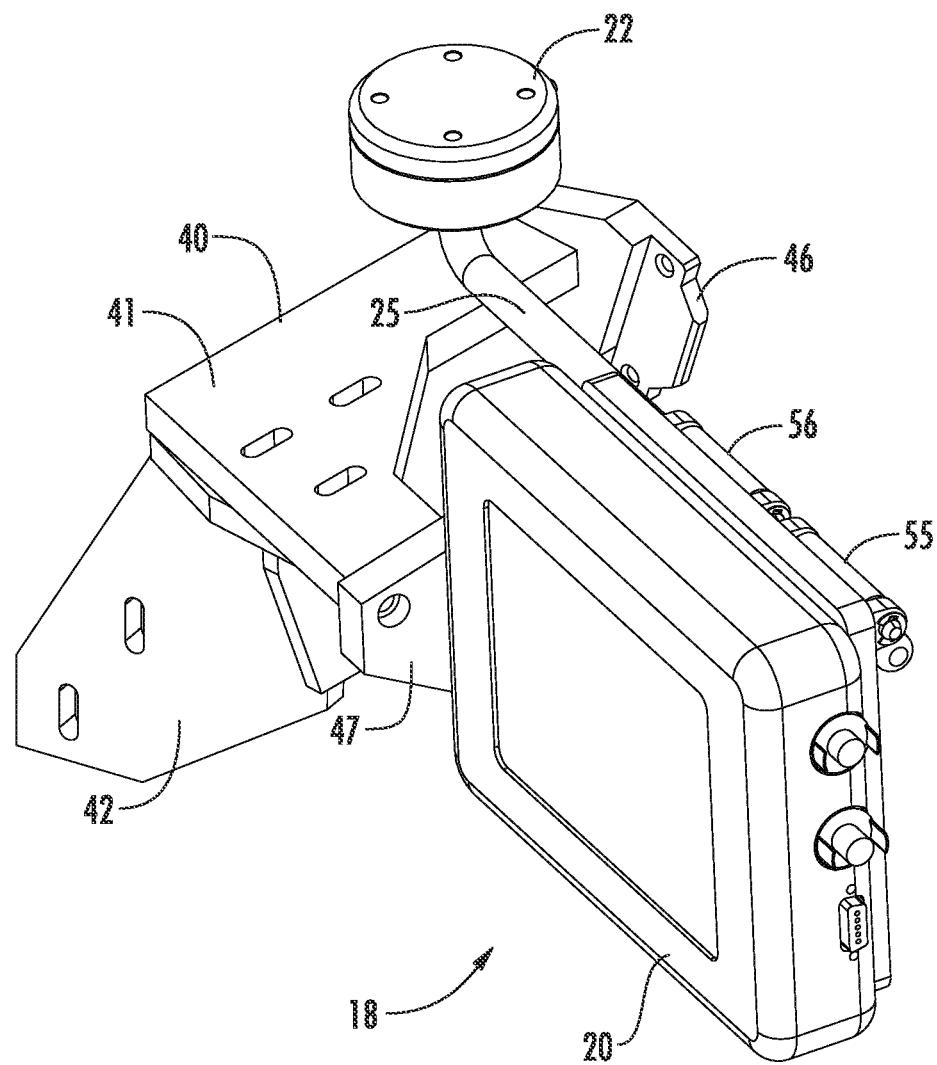
FIG. 8 is a partial perspective view of a preferred embodiment of the apparatus of the present invention showing the storage position.
Figure 9:
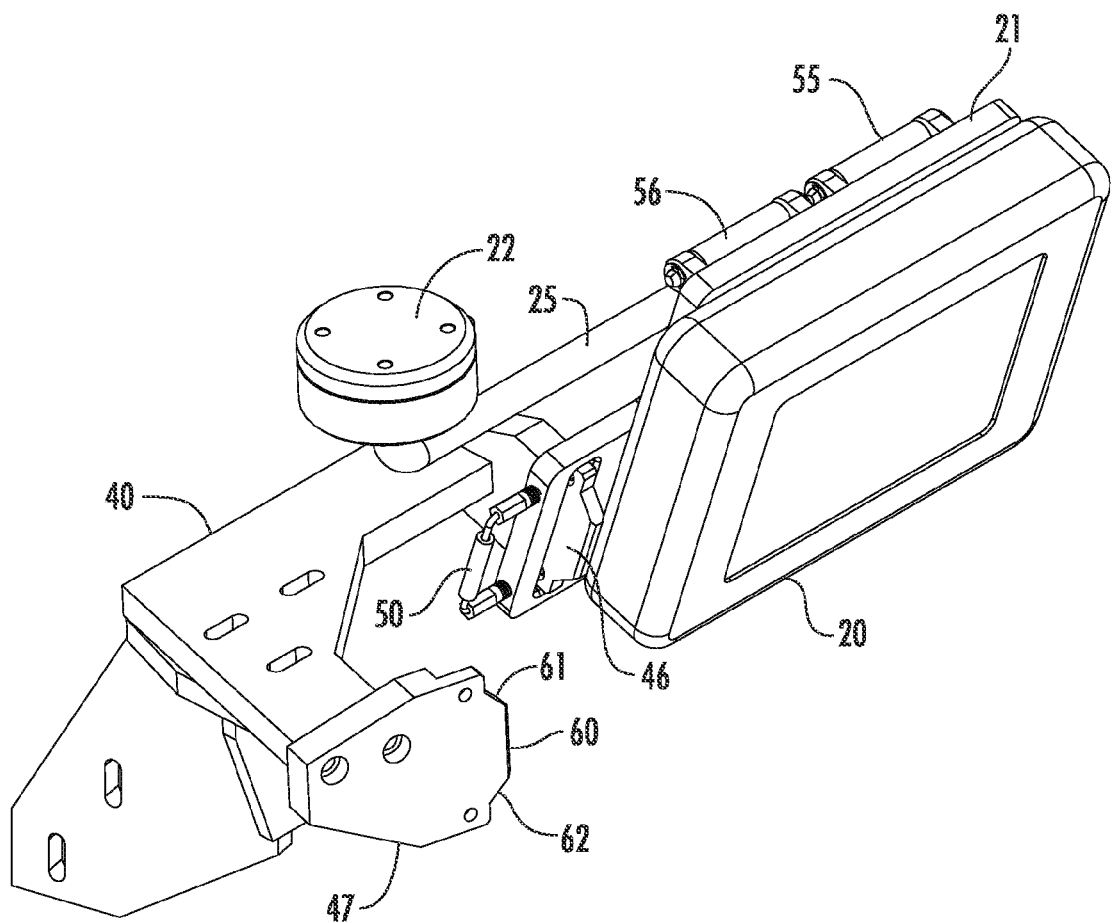
FIG. 9 is a partial perspective view of a preferred embodiment of the apparatus of the present invention showing the storage position.

FIG. 8 shows a storage position, designated by the numeral 18. In the storage position 18 of FIG. 8, the instrument or display 20 has been rotated toward the left side or driver side 16 of vehicle 11. In FIGS. 1-4, both viewing position 17 and storage position 18 are shown for the single display 20 to illustrate that the display 20 moves between first and second docketing stations.

Figure 10:
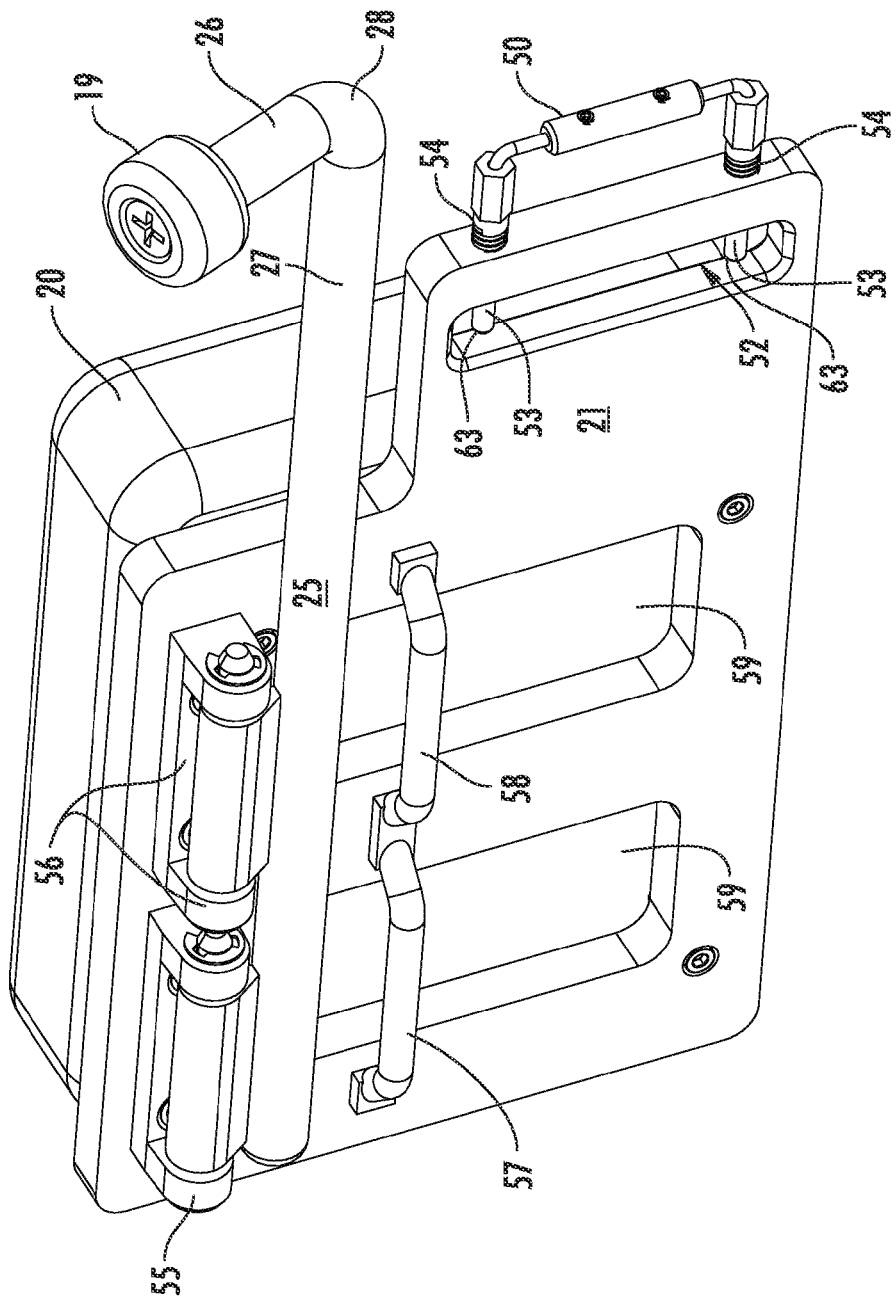
FIG. 10 is a partial perspective view of a preferred embodiment of the apparatus of the present invention.
Figure 12:
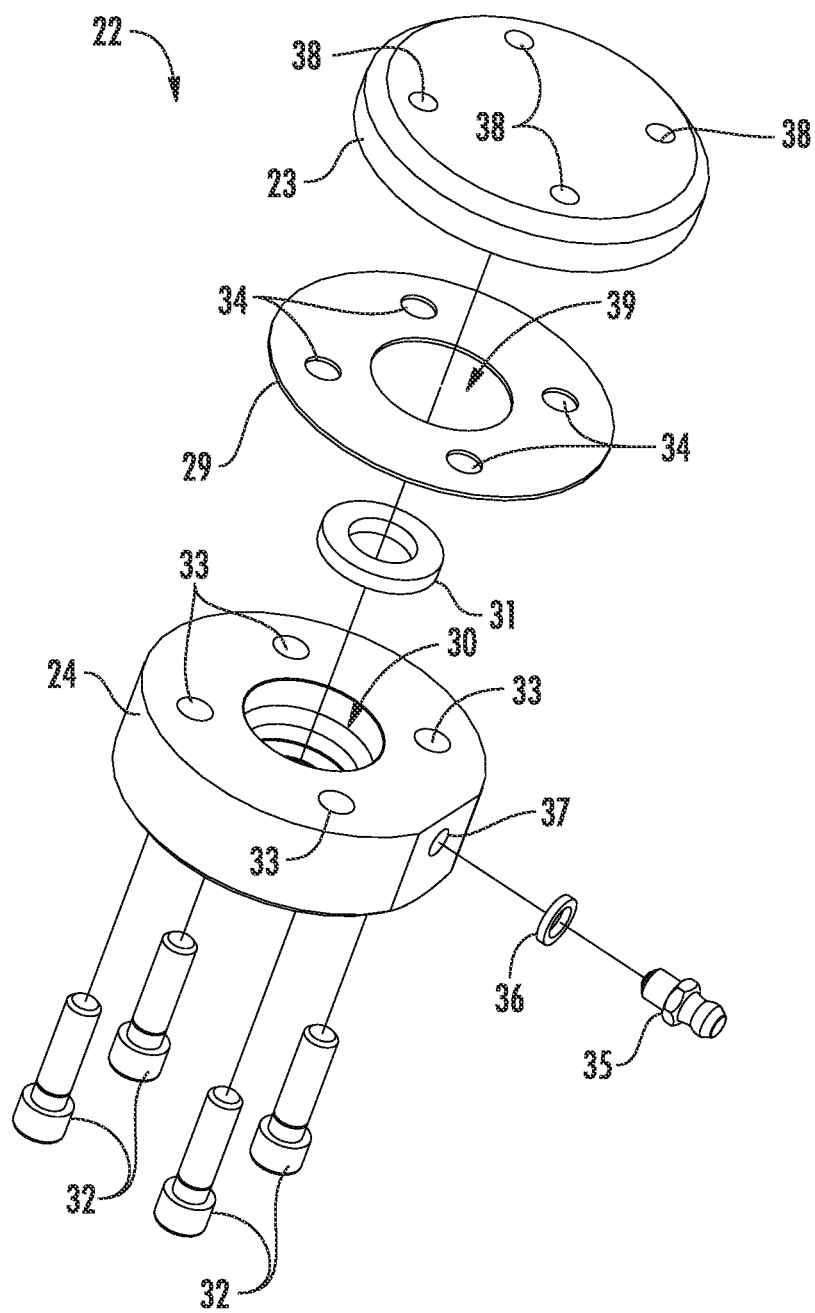
FIG. 12 is a partial perspective exploded view of a preferred embodiment of the apparatus of the present invention.

The instrument or display 20 can be mounted to support panel 21. The support panel 21 is supported upon an arm 25 that rotates about a generally vertical axis. The arm 25 has vertical section 26, horizontal section 27 and elbow or bend section 28. The spindle housing 22 and spindle/bearing 19 are shown in more detail in FIGS. 10 and 12. In FIG. 10, the spindle or bearing 19 is shown at the upper end portion of vertical section 26 of arm 25. In FIG. 12, the spindle housing 22 is shown in an exploded view.

Spindle housing 22 provides an upper housing portion 23, lower housing portion 24 and gasket 29 that is placed in between the upper and lower housing sections 23 and 24 as shown. A socket or cavity 30 in lower housing section 24 is receptive of spindle or bearing 19. The spindle or bearing 19 rests upon washer 31 which can be of a suitable or pliant material, such as rubber or a frictionless material such as Teflon. A plurality of bolts 32 can be used to assemble the parts 23, 24, 29. The lower housing portion 24 has openings 33. Gasket 29 provides openings 34. Upper housing portion 23 provides a plurality of internally threaded openings 38. These internally threaded openings 38 are receptive of externally threaded portions of bolts 32 after the bolts 32 have been passed through openings 33, 34. A grease lubricator 35 and O-ring 36 can be used for lubricating socket or cavity 30 and spindle/bearing 19 contained therein. A grease channel 37 accepts grease lubricator 35. Gasket 29 has central opening 39 that conforms generally to the shape of socket or cavity 30.

Figure 3:
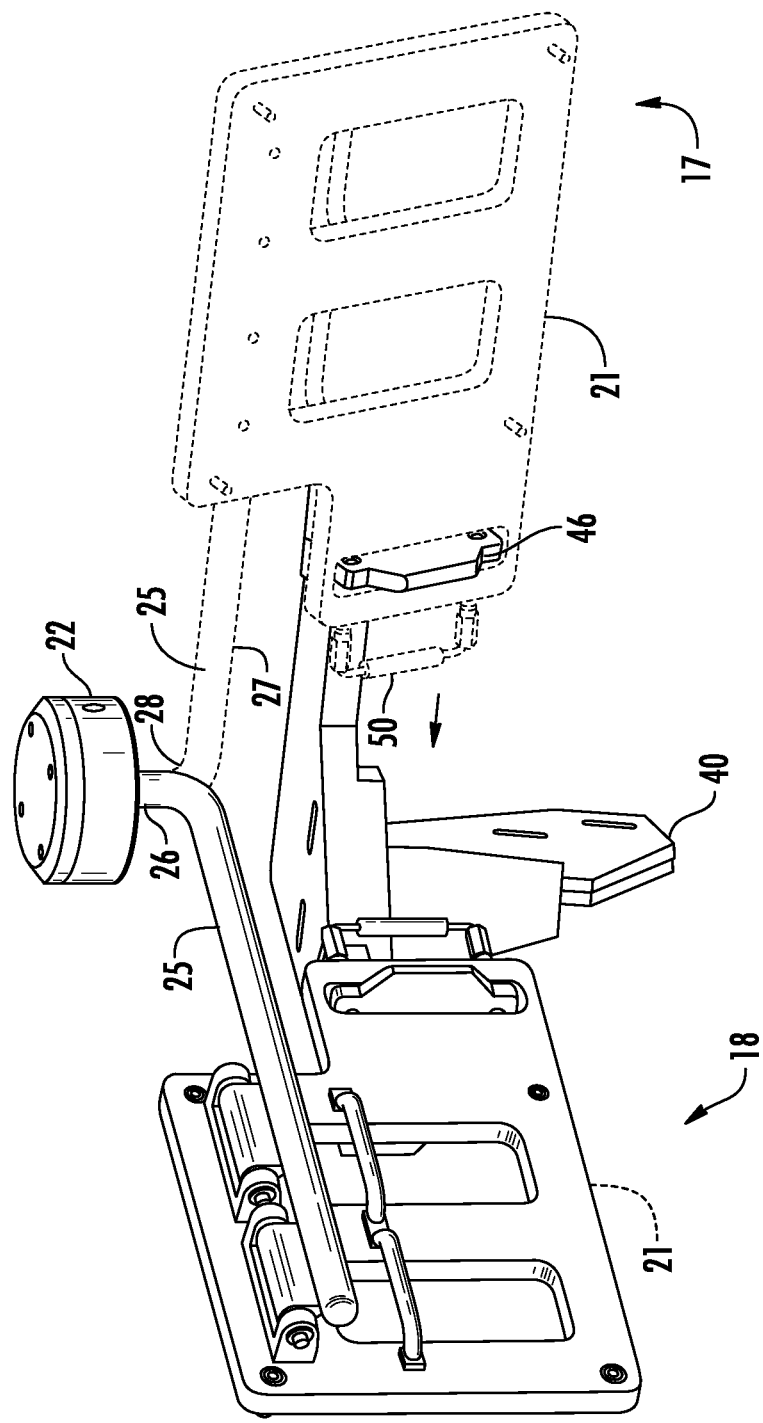
FIG. 3 is a perspective view of a preferred embodiment of the apparatus of the present invention.
Figure 4:
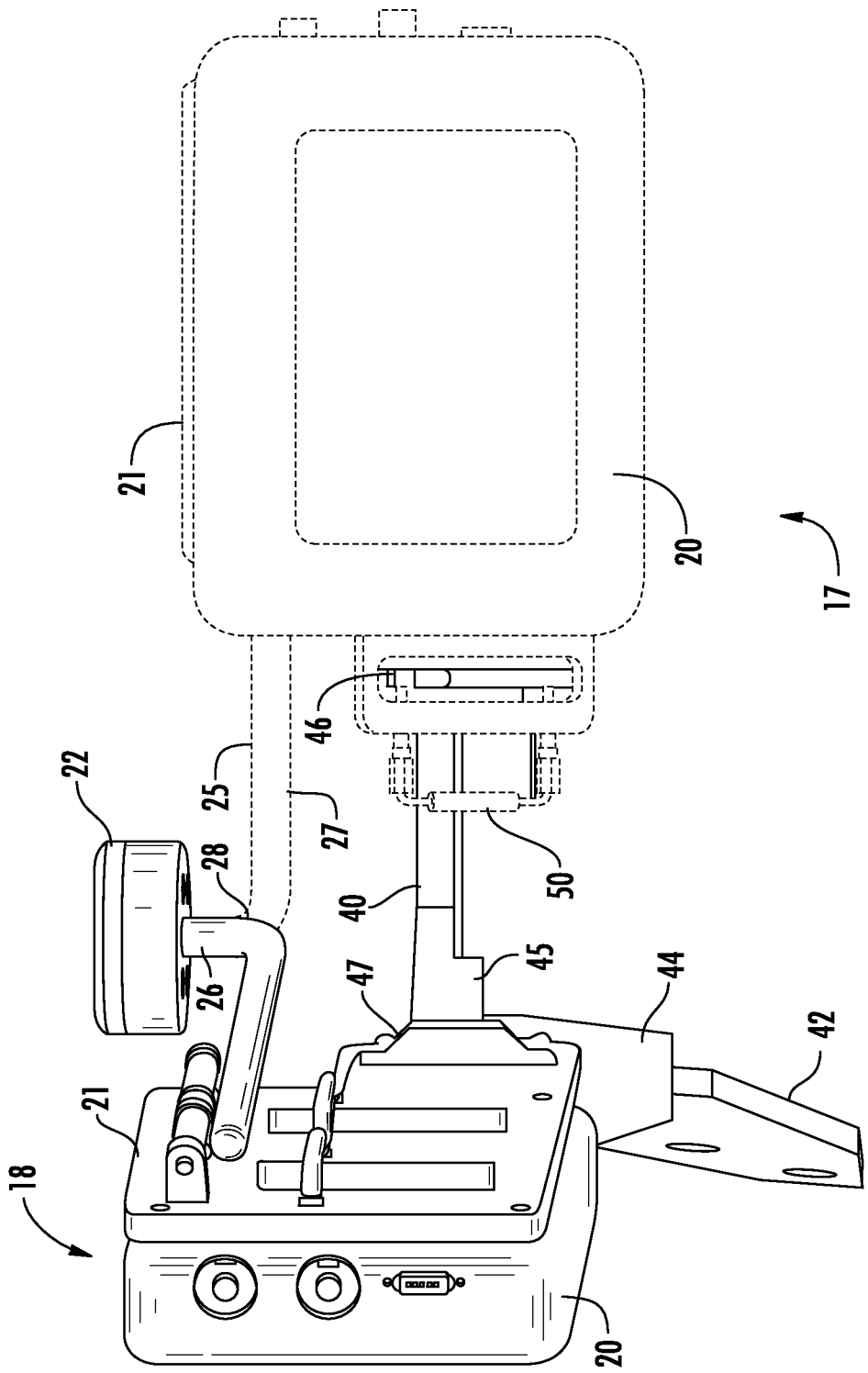
FIG. 4 is a perspective view of a preferred embodiment of the apparatus of the present invention showing viewing and storage positions.
Figure 5:
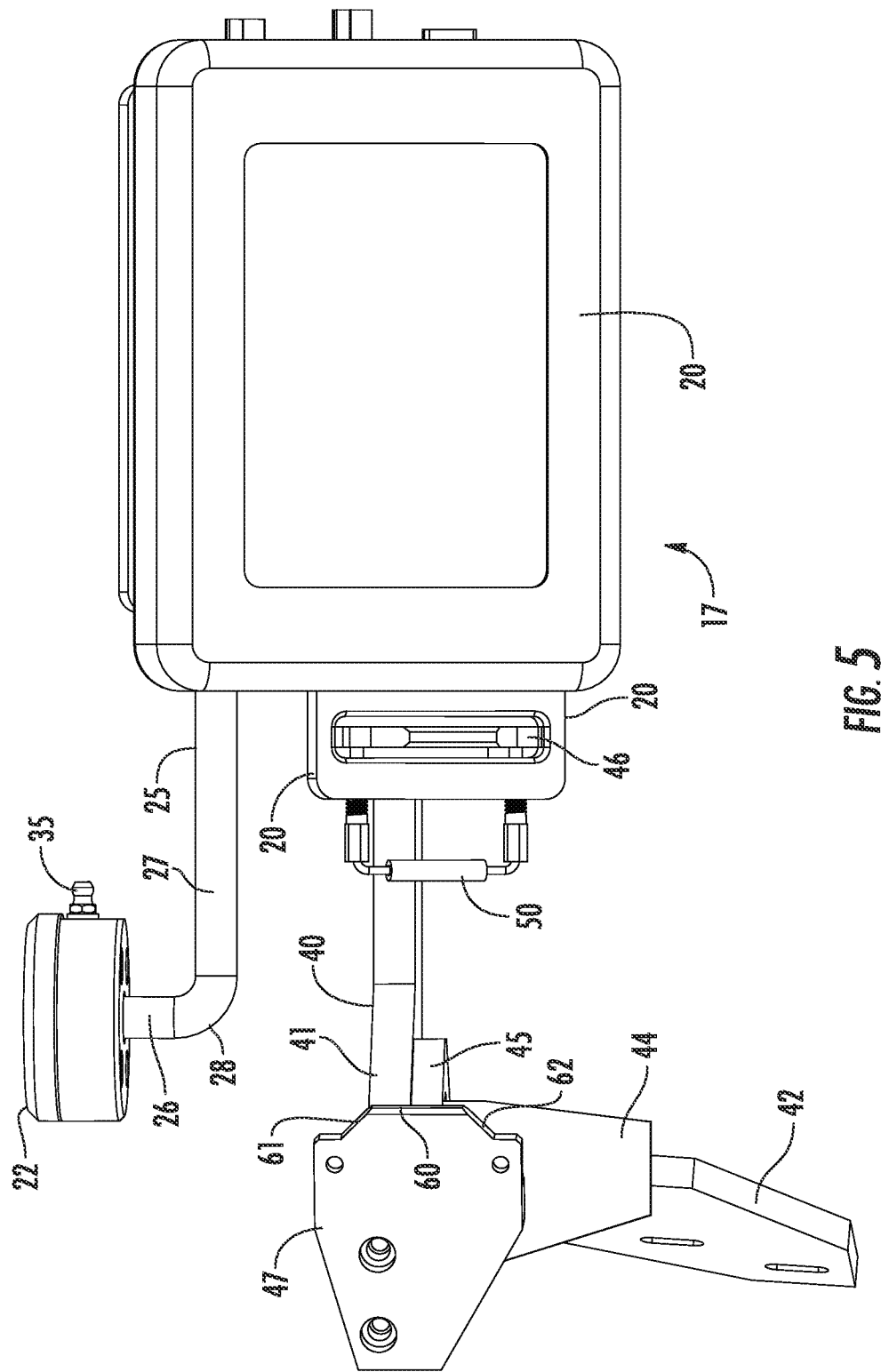
FIG. 5 is a perspective elevation view of a preferred embodiment of the apparatus of the present invention.
Figure 6:
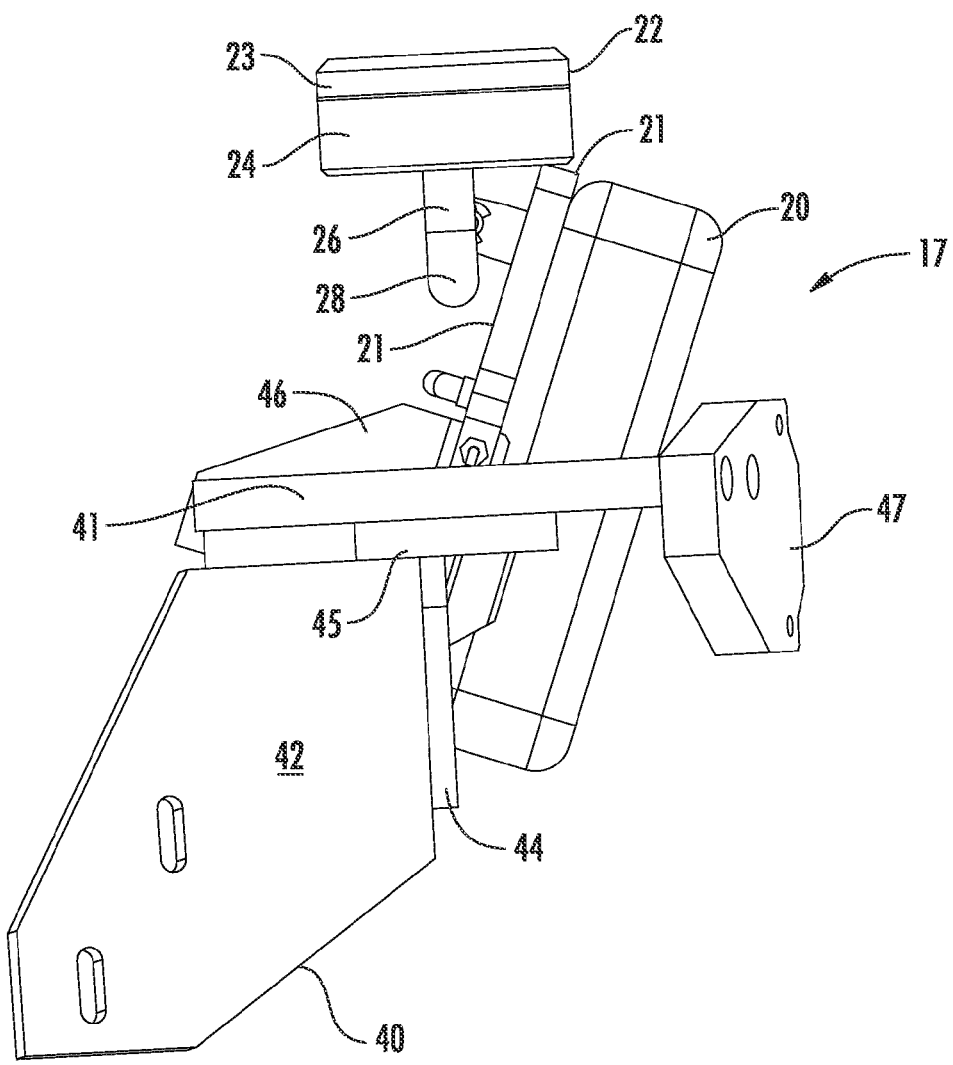
FIG. 6 is a fragmentary perspective view of a preferred embodiment of the apparatus of the present invention.
Figure 7:
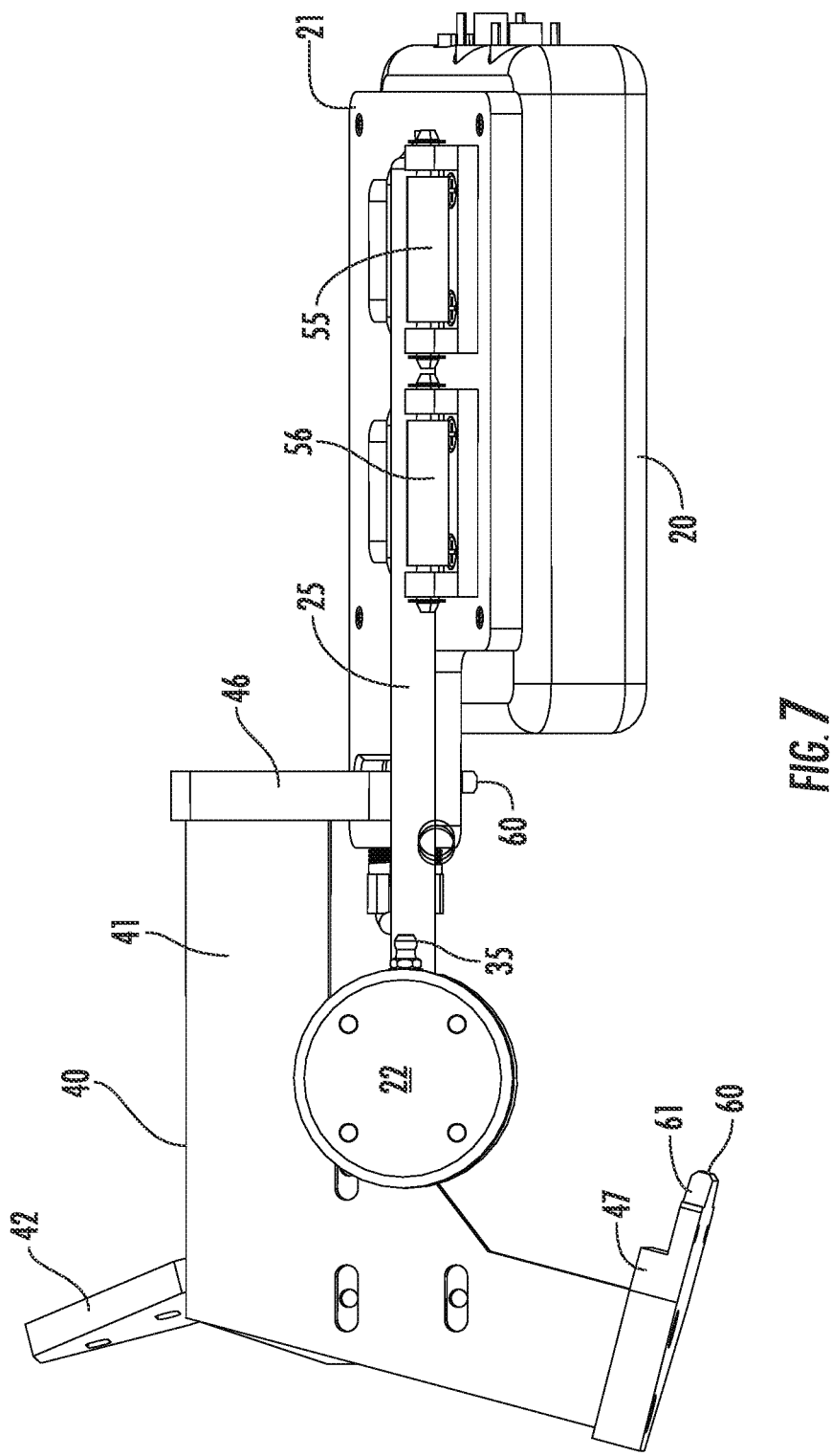
FIG. 7 is a plan or top perspective view of a preferred embodiment of the apparatus of the present invention.

In FIGS. 3-8 and 11 there is shown a frame 40 that can be connected to a vehicle 11. The frame 40 includes a base plate 41, vertical plate or bracket 42, gusset plate 44 and horizontal plate 45. Bolted connections 43 can be provided for affixing the plates 41, 42, 44, and 45 together. Upon assembly, the frame 40 provides a forward block or docking station 46 and an aft block or document station 47. Each of these docking stations or blocks 46, 47 is positioned to form a connection with support panel 21 and the instrument or display that is mounted upon the support panel 21. FIG. 3 shows the two positions 17, 18 of the support panel 21 with the instrument or display 20 removed for purposes of clarity. In the viewing position of FIG. 14, the support panel 21 forms a connection with forward block or forward docking station 46. In the storage position, support panel 21 forms a connection with the aft block or docking station 47.

Figure 11:
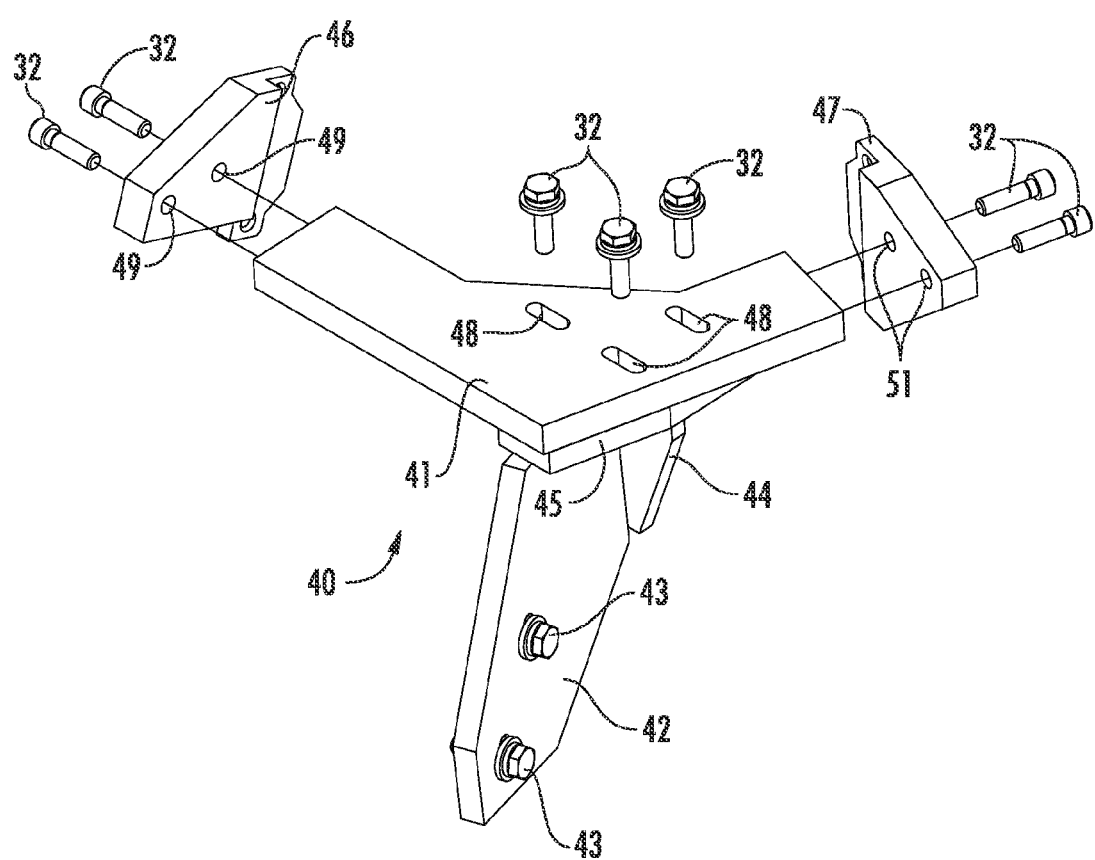
FIG. 11 is a partial perspective exploded view of a preferred embodiment of the apparatus of the present invention.

In FIG. 11, slots 48 enable connection of bolts 32 to an assembly of horizontal plate 45, gusset plate 44 and vertical plate or bracket 42. The vertical plate or bracket 42, gusset plate 44, and horizontal plate 45 can be configured to specifically adapt the base plate 41 and thus the frame 40 to any vehicle. A bolted connection 43 can be formed between the vertical plate or bracket 42 and a portion of the vehicle 11 such as a side panel, pillar or roof portion.

Base plate 41 can provide internally threaded openings that are receptive of bolts 32 after those bolts 32 pass through openings 49 or 51 of docking stations 46 or 47 as shown in FIG. 11.

A handle 50 enables a driver 12 to move the support panel 21 and thus the instrument or display 20 between the viewing position 17 and the storage position 18. Handle 50 forms the dual function of providing a gripping surface for the hand of a driver 12 as well as a locking mechanism for locking the support panel 21 to either the forward block or docking station 46 or the aft block or docking station 47. In order to move the support panel 21 from one docking station to the other, the driver 12 grasps the handle 50 and pulls the handle 50 away from support panel 21. This action compresses springs 54 thus disengaging upper and lower locking pins 53 (see FIG. 10) which engage correspondingly shaped orifices or sockets in support panel 21. When the driver 12 releases the handle 50, springs 54 return the locking pins 53 to the locking position.

The support panel 21 is mounted to arm 25 with a pivotal or hinged connection. A pair of hinges 55, 56 can be seen in FIG. 10 forming a connection between the arm 25 and support panel 21. In this fashion, the support panel 21 and its supported instrument or display 20 can be rotated about arm 25 to position the display 20 in the best position for the driver. Support panel 21 can be provided with cable supports 57, 58. Support panel 21 can provide openings 59. Each docking station 46, 47 can provide a forward edge 60 and upper and lower inclined surfaces 61, 62. The end portion of each locking pin 53 can be chamfered so that when the locking pins 53 engage the front of a docking station 46 or 47, they are automatically retracted to compress the springs 54 until support panel 21 is in its proper position wherein the pins 53 interlock with provided sockets 63 and plate 21.

The following is a list of suitable for the various elements of the preferred embodiment of the present invention.

| PARTS LIST | |
|---|---|
| Parts Number | Description |
| 10 | vehicle instrument support |
| 11 | vehicle |
| 12 | driver |
| 13 | head of driver |
| 14 | front window/windshield |
| 15 | roof/roof portion |
| 16 | left side/driver side |
| 17 | viewing position |
| 18 | storage position |
| 19 | spindle/bearing |
| 20 | instrument/display |
| 21 | support panel |
| 22 | spindle housing |
| 23 | upper housing portion |
| 24 | lower housing portion |
| 25 | arm |
| 26 | vertical section |
| 27 | horizontal section |
| 28 | bend |
| 29 | gasket |
| 30 | socket/cavity |
| 31 | washer |
| 32 | bolt |
| 33 | opening |
| 34 | opening |
| 35 | grease lubricator |
| 36 | o-ring |
| 37 | grease channel |
| 38 | internally threaded opening |
| 39 | opening |
| 40 | frame |
| 41 | base plate |
| 42 | vertical plate/bracket |
| 43 | bolted connection |
| 44 | gusset plate |
| 45 | horizontal plate |
| 46 | forward block/docking station |
| 47 | aft block/docking station |
| 48 | slot |
| 49 | opening |
| 50 | handle |
| 51 | opening |
| 52 | slot |
| 53 | locking pin |
| 54 | spring |
| 55 | hinge |
| 56 | hinge |
| 57 | cable support |
| 58 | cable support |
| 59 | opening |
| 60 | forward edge |
| 61 | upper inclined surface |
| 62 | lower inclined surface |
| 63 | socket |

All measurements disclosed herein are at standard temperature and pressure, at sea level on Earth, unless indicated otherwise.

The foregoing embodiments are presented by way of example only; the scope of the present invention is to be limited only by the following claims.

The invention claimed is:

1. A vehicle instrument support and storage apparatus for a vehicle having a driver's seat for a driver, comprising:
   a) a frame having a plate configured for attachment to the interior of the vehicle;
   b) the frame having first and second docking stations;
   c) a rotary bearing that is attachable to the vehicle;
   d) a support panel, and a support arm having inner and outer end portions, the arm inner end portion being connected to the rotary bearing;
   e) the support panel being affixed to the outer end portion of the support arm;
   f) a locking portion that interlocks the support panel to one of the docking stations;
   g) wherein an interlock of the support panel with the first docking station places the support panel in a first position that is in front of the driver's seat when the apparatus is installed in the vehicle;
   h) wherein an interlock of the support panel with the second docking station places the support panel in a position that is spaced away from said first position;
   i) the locking portion including a handle that enables the driver to grasp the handle to:
     1) move the support panel to either one of the docking stations; and
     2) selectively connect the support panel to or disconnect the support panel from a selected one of the docking stations; and
   j) wherein the support panel has an opening and the selected one of the docking stations occupies said opening when the support panel is interlocked with the selected one of the docking stations.

2. The vehicle instrument support and storage apparatus of claim 1 wherein the support panel is pivotally attached to the support arm.

3. The vehicle instrument support and storage apparatus of claim 2 wherein the support panel has inner and outer edge portions, and the handle is positioned next to the inner edge portion of the support panel.

4. The vehicle instrument support and storage apparatus of claim 1 wherein the rotary bearing is positioned above the frame.

5. The vehicle instrument support and storage apparatus of claim 1 wherein the handle carries one or more locking pins and each docking station has one or more openings that are receptive of the pin or pins.

6. The vehicle instrument support and storage apparatus of claim 1 wherein the support panel interlocks with the selected docking station at a position generally in between the arm outer end portion and the rotary bearing.

7. The vehicle support panel and storage apparatus of claim 1 wherein in step "h" the support panel is laterally spaced away from first position.

8. The vehicle support panel and storage apparatus of claim 1 wherein in step "h" the support panel is radially spaced away from first position.

9. The vehicle support panel and storage apparatus of claim 1 wherein in step "h" the support panel is circumferentially spaced away from first position.

10. The vehicle support panel and storage apparatus of claim 1 wherein the support panel moves in a pivot motion to either one of the docking stations.

11. A vehicle instrument support and storage apparatus for a vehicle having a driver's seat for a driver, comprising:
   a) a frame having a plate configured for attachment to an interior of the vehicle;
   b) the frame having first and second docking stations;

c) a rotary bearing that is attachable to the vehicle;
d) a support panel, and a support arm having inner and outer end portions, the arm inner end portion being connected to the rotary bearing;
e) the support panel being affixed to the outer end portion of the support arm;
f) a locking portion that interlocks the support panel to one of the docking stations;
g) wherein an interlock of the support panel with the first docking station places the support panel in a first position that is in front of the driver's seat when the apparatus is installed in the vehicle;
h) wherein an interlock of the support panel with the second docking station places the support panel in a position that is spaced away from said first position;
i) the locking portion including a handle that enables the driver to grasp the handle to:
   1) move the support panel to either one of the docking stations; and
   2) selectively connect the support panel to or disconnect the support panel from a selected one of the docking stations; and
j) wherein the docking stations each provide a plate, the plates being configured to extend into and occupy an opening of the support panel.

12. The vehicle instrument support and storage apparatus of claim 11 wherein each plate has one or more inclined surfaces.

13. The vehicle instrument support and storage apparatus of claim 11 wherein each plate has plate openings and the handle interlocks with the plate by connecting with the plate at the plate openings.

14. A vehicle instrument support and storage apparatus for a vehicle having a vehicle interior with a driver's seat for a driver, comprising:
   a) a frame having a plate configured for attachment to the interior of the vehicle;
   b) the frame having first and second docking stations, each docking station having a projecting portion;
   c) a rotary bearing that is attachable to the vehicle interior;
   d) a support panel, and a support arm having inner and outer end portions, the arm inner end portion being connected to the rotary bearing;
   e) the support panel being affixed to the outer end portion of the support arm;
   f) a locking portion that interlocks the support panel to one of the projecting portions of the docking stations;
   g) wherein an interlock of the support panel with the projecting portion of the first docking station places the support panel in a first position in front of the driver's seat when the apparatus is installed in the vehicle;
   h) wherein an interlock of the support panel with the projecting portion of the second docking station places the support panel in a position that is spaced away from the first position;
   i) the locking portion including a locking pin or pins that interlock the support panel and a selected one of the projecting portions; and
   j) wherein the support panel has an opening and the projecting portion of either one of the docking stations occupies said opening when the support panel is interlocked with the selected one of the docking stations.

15. The vehicle instrument support and storage apparatus of claim 14 wherein the support panel is pivotally attached to the support arm.

16. The vehicle instrument support and storage apparatus of claim 15 wherein the support panel has inner and outer edge portions, and a handle is positioned next to the inner edge portion of the support panel.

17. The vehicle instrument support and storage apparatus of claim 14 wherein the rotary bearing is positioned above the frame.

18. The vehicle instrument support and storage apparatus of claim 14 wherein the support panel interlocks with a selected docking station at a position generally in between the arm outer end portion and the rotary bearing.

19. The vehicle instrument support and storage apparatus of claim 14 wherein the projecting portions each include a plate, the plates being configured to extend into and occupy the opening of the support panel.

20. The vehicle instrument support and storage apparatus of claim 19 wherein each plate has one or more inclined surfaces.

21. The vehicle instrument support and storage apparatus of claim 19 wherein each plate has plate openings and a handle interlocks with the plate by connecting with the plate at the plate openings.

22. The vehicle support panel and storage apparatus of claim 14 wherein in step "h" the support panel is laterally spaced away from first position.

23. The vehicle support panel and storage apparatus of claim 14 wherein in step "h" the support panel is radially spaced away from first position.

24. The vehicle support panel and storage apparatus of claim 14 wherein in step "h" the support panel is circumferentially spaced away from first position.

25. A vehicle instrument support and storage apparatus for a vehicle having a vehicle interior with a driver's seat for a driver, comprising:
   a) a frame having a plate configured for attachment to the interior of the vehicle;
   b) the frame having first and second docking stations, each docking station having a projecting portion;
   c) a rotary bearing that is attachable to the vehicle interior;
   d) a support panel, and a support arm having inner and outer end portions, the arm inner end portion being connected to the rotary bearing;
   e) the support panel being affixed to the outer end portion of the support arm;
   f) a locking portion that interlocks the support panel to one of the projecting portions of the docking stations;
   g) wherein an interlock of the support panel with the projecting portion of the first docking station places the support panel in a first position in front of the driver's seat when the apparatus is installed in the vehicle;
   h) wherein an interlock of the support panel with the projecting portion of the second docking station places the support panel in a position that is spaced away from the first position;
   i) the locking portion including a locking pin or pins that interlock the support panel and a selected one of the projecting portions; and
   j) wherein a handle carries one or more of the locking pins and each docking station has one or more openings that are receptive of the pin or pins.

* * * * *